United States Patent [19]

von Gaisberg et al.

[11] Patent Number: 5,029,048
[45] Date of Patent: Jul. 2, 1991

[54] ILLUMINATED ELECTRIC CIGARETTE LIGHTER WHICH CAN BE AUTOMATICALLY ASSEMBLED

[75] Inventors: Alexander von Gaisberg, Beilstein; Günther Ante, Frankfurt, both of Fed. Rep. of Germany

[73] Assignees: Schoeller & Co.; Elektrotechnische Fabrik GmbH & Co., both of Frankfurt, Fed. Rep. of Germany

[21] Appl. No.: 494,382

[22] Filed: Mar. 16, 1990

[30] Foreign Application Priority Data

Mar. 16, 1989 [DE] Fed. Rep. of Germany ....... 3908617

[51] Int. Cl.⁵ .................................................. F21V 7/04
[52] U.S. Cl. ........................................ 362/32; 362/92; 362/154; 362/80; 219/269
[58] Field of Search ............ 362/80, 92, 32, 154, 362/365, 802, 100; 219/269, 262, 267, 268, 263, 264

[56] References Cited

U.S. PATENT DOCUMENTS

| 2,506,181 | 5/1950 | Thibault | 362/154 |
| 2,701,297 | 2/1955 | Thibault | 362/32 |
| 4,079,242 | 3/1978 | Seibel | 362/32 |
| 4,650,962 | 3/1987 | Pramaggiore | 219/269 |
| 4,713,733 | 12/1987 | Fitz et al. | 362/80 |

FOREIGN PATENT DOCUMENTS

| 200247A2 | 12/1986 | European Pat. Off. | |
| 1966946 | 8/1967 | Fed. Rep. of Germany . | |
| 2254712 | 8/1973 | Fed. Rep. of Germany . | |
| 7321282 | 10/1973 | Fed. Rep. of Germany . | |
| 7323648 | 10/1973 | Fed. Rep. of Germany . | |
| 2329040 | 1/1975 | Fed. Rep. of Germany . | |
| 2203163 | 5/1975 | Fed. Rep. of Germany . | |
| 2535080 | 2/1977 | Fed. Rep. of Germany . | |
| 2948723 | 7/1980 | Fed. Rep. of Germany . | |
| 3001367 | 7/1980 | Fed. Rep. of Germany . | |
| 3008772 | 9/1980 | Fed. Rep. of Germany . | |
| 8903941.6 | 9/1989 | Fed. Rep. of Germany . | |
| 2235022 | 1/1975 | France | 219/269 |
| 2371641 | 6/1978 | France . | |
| 2436939 | 4/1980 | France . | |
| 2436940 | 4/1980 | France . | |
| 767444 | 2/1957 | United Kingdom . | |
| 1139159 | 1/1969 | United Kingdom . | |
| 2089012A | 6/1982 | United Kingdom . | |
| 2149896A | 6/1985 | United Kingdom . | |

Primary Examiner—James C. Yeung
Attorney, Agent, or Firm—Armstrong, Nikaido, Marmelstein, Kubovcik & Murray

[57] ABSTRACT

An illuminated electric cigarette lighter which can be assembled automatically includes a beaker-shaped clamping sleeve which encloses a socket preassembled therein and has an arrangement of a lamp and of contact parts which is central and near to the axis of the sleeve. In this manner, an illuminated electric cigarette lighter is provided which is largely of rotationally-symmetric construction and which can be assembled automatically by means of one single linear mating movement.

27 Claims, 3 Drawing Sheets

ILLUMINATED ELECTRIC CIGARETTE LIGHTER WHICH CAN BE AUTOMATICALLY ASSEMBLED

BACKGROUND OF THE INVENTION

The present invention relates to an electric cigarette lighter.

Economical automation of assembly represents an imperative goal of the future, in particular under the increasing pressure of competition, to exploit fully all the economic potential of production technology.

An electric cigarette lighter, in particular of the type to be installed in the instrument panel of a motor vehicle, is known from German patent specification 2,535,080, wherein the electric cigarette lighter has an illumination device which consists essentially of a lamp, a lamp housing and an illumination ring arranged between the instrument panel and the cigarette lighter socket.

This illumination device, known from the prior art, needs to be improved from the aspect of a product design appropriate to assembly, said design being a prerequisite for economical automation of assembly. Thus it is disadvantageous, for example, to arrange the lamp and the lamp housing eccentrically outside the region defined by the diameter of the illumination ring. For this reason, the known illumination device described above does not allow a linear mating movement when the lighter assembly is being inserted in the installation opening of the instrument panel. Instead, a curved insertion movement is required, which prevents or renders difficult the use of assembly robots. It is also disadvantageous that the illumination device cannot be preassembled together with the socket at the suppliers' works, thereby necessitating three individual assembly steps at the automobile works. Thus, after insertion of the illumination ring in the instrument panel, the socket must be depressed into the panel opening, in which case the illumination ring has to be held firm until clamping tabs constructed in the illumination ring have been spread out for the purpose of catching in the instrument panel, with the clamping tabs being spread out by the insertion of socket. Furthermore, these clamping tabs also impair the even distribution of light in the illumination ring. In this case, attention must be paid additionally to the correct mutual positioning of the illumination ring and the socket. For this purpose, aligning tabs are required in the illumination ring, which aligning tabs break off when the socket is inserted. Finally, in a third assembly step, a connection plug situated in the rear part of the instrument panel must be connected for the electric current supply to the lamp and to the heating element of the cigarette lighter. Furthermore, the illumination device known from such prior art also has a relatively large number of individual parts. Thus the lamp socket alone consists of five individual parts and, in addition to these, there are also the lamp housing, with the rubbing contact surface required due to the ground contact to be produced to the socket, and the illumination ring itself.

SUMMARY OF THE INVENTION

It is therefore the object of the present invention to avoid the above mentioned disadvantages, and to construct an illumination and clamping device of an electric cigarette lighter to be appropriate for assembly in such a way that an automation of assembly is achievable with the assistance of industrial robots, which is favorable in terms of both time and costs.

Due to the fact that the clamping sleeve bearing the lamp is constructed to be hollow, closed at one end and of cylindrical shape, and consequently receives the lighter socket in a largely form-fitting manner, a product design is achieved which is appropriate to final assembly. Since, compared with the prior art, there is no longer an eccentric, remote lamp arrangement, the socket can now be preassembled in the clamping sleeve at the suppliers' works. The clamping sleeve preassembled together with the socket can be inserted into the opening in the instrument panel of a motor vehicle by an industrial robot by a linear mating movement. Since all the contact parts arranged at the beaker bottom of the socket penetrate the beaker bottom of the clamping sleeve centrally, a central connection is guaranteed which offers further advantages of assembly. Thus the electric current supply system connection plug can also be contacted with the aid of one single straight-line insertion mating movement of the preassembled lighter assembly into the instrument panel. The need for subsequent plugging on of the connection plug to the assembly is consequently eliminated. Due to the fact that the lamp receptacle for the lamp is constructed in the clamping sleeve bottom provided between the clamping sleeve wall and the connection plug, the eccentricity of the lamp arrangement, which is disadvantageous in the prior art, is avoided. Since the light is now generated essentially centrally near to the axis in the region of the beaker bottom of the clamping sleeve and streams into the compact material of the clamping sleeve bottom, after the light is conducted via the jacket surface of the beaker wall, an extremely homogeneous distribution of light is produced in the illumination ring arranged at the front of the lighter, whereas, with the arrangement of the lamp known from the prior art, the light streams laterally into the material, which causes undesired brightness gradients to arise around the illumination ring.

Since the clamping sleeve according to the invention can be preassembled with the socket, the engagement, catching or retaining of the clamping sleeve in the instrument panel or motor vehicle dashboard is independent of the separate insertion of the socket, unlike the prior art discussed above. According to a preferred embodiment, a plurality of groups of clamping ribs of different lengths is therefore symmetrically arranged radially on the surface of the preferably hollow cylindrical wall of the clamping sleeve. By this means, with the peripheral retaining forces remaining the same, a secure engagement of the clamping sleeve can be achieved in a simple manner with one single linear mating movement even with instrument panels of different thicknesses.

It is also envisaged in an advantageous development of the invention that the clamping sleeve bottom is sloped conically in the form of a truncated cone. By this means, the assembly robot tolerates small alignment deviations when picking up the lighter assembly such that a non-obstructing insertion of the clamping sleeve into the instrument panel is always guaranteed.

Conventionally the contact parts can also be designed as contact surfaces, by which means a coding of the contact parts desired for the azimuthal alignment of the clamping sleeve is determined in conjunction with an L-shaped or I-shaped arrangement of the contact parts.

In a particularly advantageous development, it has been found expedient to arrange the contact parts, which penetrate the clamping sleeve bottom, in the form of a coaxial connection. In this case, strip-like light passage slots can be provided in the hollow cylindrical annular contacts arranged coaxially so that the light of a lamp preferably arranged centrally and axially in the beaker bottom can stream into the material of the clamping sleeve wall. However, the coaxial connection can also be arranged to be on the connection plug side, outside at the bottom of the clamping sleeve, by which means no light passage slots are then required. With this particularly preferred coaxial connection embodiment, besides the rotationally symmetric construction of the clamping sleeve itself, a rotationally symmetric arrangement of the contact parts and of the lamp is additionally created, which enables automatic assembly to be completely independent of azimuthal orientation or direction.

According to a further embodiment, the lamp receptacle can be constructed eccentrically or centrally and axially in the clamping sleeve bottom and can be of open design on the connection plug side. By this means it is possible for the lamp itself to be installed in the connection plug while the place of greatest light density within the clamping sleeve bottom is determined.

It is envisaged in a further advantageous embodiment that the lamp receptacle is aligned radially in the wall of the clamping sleeve bottom and, in this case, penetrates a contact part, arranged centrally and constructed as a contact surface, in a bore hole provided in the bottom. By this means, the advantages of a central arrangement of the contact parts are combined with the advantage of a central arrangement of the lamp. Additionally, the rubbing contact surface on the lamp housing, required in the prior art to produce the ground connection, can be eliminated, since the lamp connection wires with this arrangement can be soldered directly onto the corresponding contact parts.

According to a particularly preferred exemplary embodiment, the protrusions of the clamping ribs serving to retain the clamping sleeve in a manner appropriate to assembly are preferably aligned so as to be equidistant and parallel to the axis. By this means a rotationally-symmetric distribution of the retaining forces is guaranteed. In a further embodiment, the individual clamping ribs have insertion slopes which permit easy insertion of the clamping sleeve in an instrument panel which is preferably of thermoset plastic.

According to a further embodiment of the invention, the cross-sectional profiles of the clamping ribs are constructed in an advantageous manner to be resilient, so that the clamping ribs firstly deflect inwards during the pushing on motion, and deflect out again behind the pushed on instrument panel. For this purpose, cavities can preferably be present under the clamping ribs in order to enable a deflective action of the clamping ribs. In this manner, secure assembly of the clamping sleeve according to the invention in the instrument panel is provided against rattling and rotation.

BRIEF DESCRIPTION OF THE DRAWINGS

The invention is described and explained in greater detail below with reference to several exemplary embodiments shown in the accompanying drawings, wherein:

FIGS. 10a–14f show different cross-sectional profiles of different clamping ribs.

DETAILED DESCRIPTION OF THE PREFERRED EMBODIMENT

Figure 1:
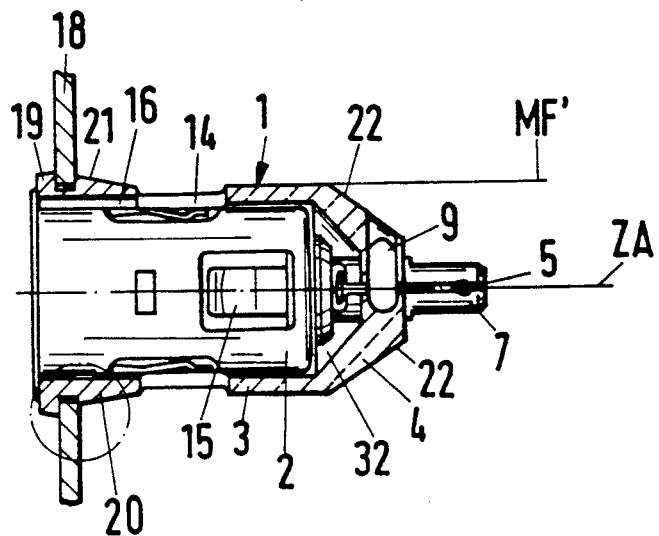
FIG. 1 shows a sectional view of the clamping sleeve according to the invention, together with the conventional socket of an electric cigarette lighter, mounted in the instrument panel of a motor vehicle as well as two detail views (FIGS. 1a and 1b)
Figures 1A, 1B:
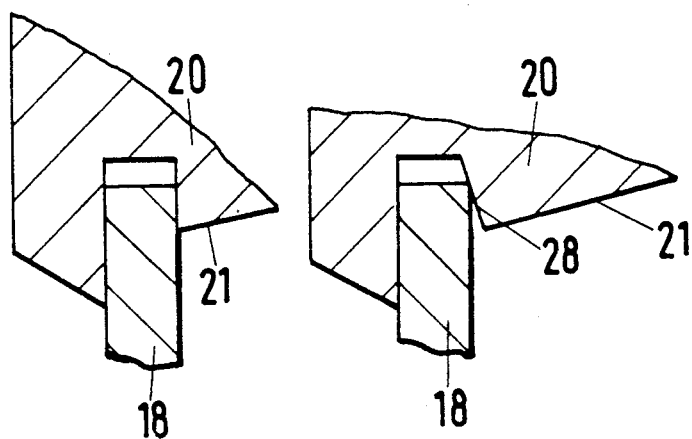

FIG. 1 illustrates a cross-section of a first exemplary embodiment of a clamping sleeve 1 according to a invention, together with the socket 2 enclosed in a largely form-fitting manner by said sleeve. The clamping sleeve 1, which includes a beaker or cylindrical wall 3 with a beaker bottom or closed bottom 4, is made of light-conducting material and is molded in an integral manner in terms of material. The clamping sleeve wall 3 is constructed in the form of a straight hollow cylinder whereas the clamping sleeve bottom 4 is constructed essentially in the shape of a solid cylinder, the bottom 4 being sloped in the form of a truncated cone by means of a slope 22, with wall 3 and bottom 4 having a circular cross-sectional surface. However, other, e.g. elliptical, cross-sectional surfaces can also be employed. Adjacent the bottom of the socket 2, which is likewise of beaker-shaped or cylindrical-shaped construction and receives a holding element together with a bulb (not shown), ends of a first positive potential contact part 5 and a negative potential contact part 7 are arranged. For this purpose, the clamping sleeve bottom 4 has a receptacle 32 likewise constructed in the shape of a truncated cone. A second positive potential contact part 6 (FIG. 4, 5) is located in the beaker bottom 4 of the clamping sleeve 1 without penetrating the beaker bottom 4. The contact parts 5, 7 penetrate shaped recesses 12 (FIG. 2) in the beaker bottom 4. All the contact parts 5, 6, 7 are arranged inside a region.. bordered by an imaginary hollow cylinder surface MF' of an imaginary hollow cylinder. In this case, the imaginary hollow cylinder surface MF' adjoins and is an extension of the beaker wall 3 in the direction of plugging into the socket, the outside diameter of the imaginary hollow cylinder surface thus corresponding to the outside diameter of the clamping sleeve 1. The mating movement of an assembly robot extends along a central axis ZA. The clamping sleeve 1 is captured in a secure manner behind an instrument panel 18 with the aid of clamping ribs 20 which have insertion slopes 21. The enlarged detail view FIG. 1b) shows a variant of the clamping ribs 20 with an additional removal slope 28. A slope on the instrument panel 18 corresponding to the latter slope additionally supports the capturing process of the clamping sleeve 1.

Figure 2:
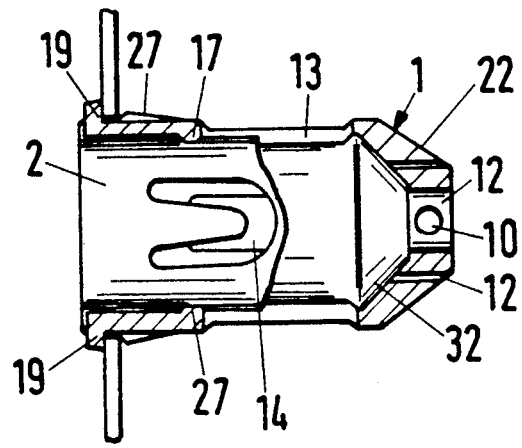
FIG. 2 shows a lateral sectional view of the clamping sleeve of the invention according to a first exemplary embodiment.
Figure 3:
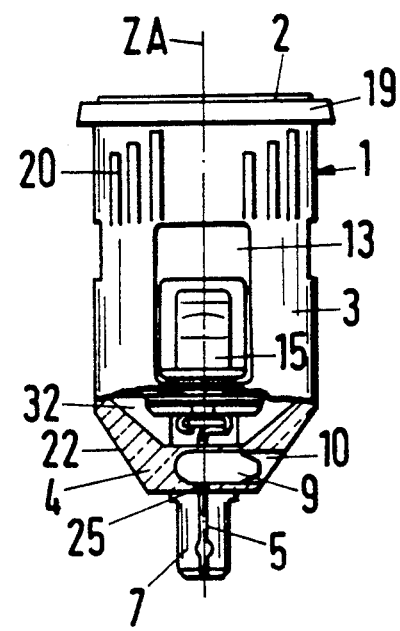
FIG. 3 shows a lateral view (partially cut away), of the clamping sleeve of the invention according to the first exemplary embodiment.

FIGS. 2, and 3 show further lateral (sectional at least in part) views of the clamping sleeve 1 of the invention according to the first exemplary embodiment. Situated in the jacket surface of the beaker wall 3 are first bore holes 13 for the bimetal springs 15 of the socket 2, which bimetal springs 15 deflect out during operation of the lighter. Catches 27 molded onto the inside wall of the illumination clamping sleeve 1 are provided for retaining socket 2 therein. A lamp receptacle 10 is molded into bottom 4 radially and is open laterally. A lamp 9, preferably a long-life lamp with, e.g., 104 hours of illumination, can be inserted in receptacle 10 and can be electrically connected by lamp connection wires 11 to the second positive potential contact part 6 as well as to the negative potential contact part 7. The clamping sleeve bottom 4 has a slope 22 in the shape of a truncated cone which facilitates insertion of the clamping sleeve into the instrument panel 18.

Figure 4:
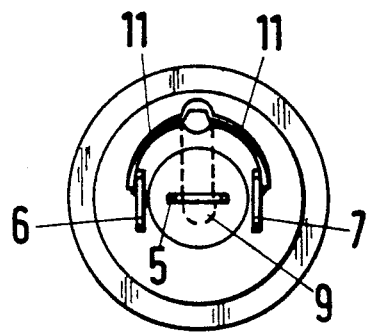
FIG. 4 shows a plan view of the arrangement of the contact parts of the first exemplary embodiment.

FIG. 4 shows a plan view of the arrangement of the contact parts 5, 6, 7 of the first exemplary embodiment. The contact parts 6, 7 are connected to the lamp 9 via lamp connection wires 11. The negative potential contact part 7 contacts the beaker wall of the metal socket 2 so that electrical current is applied via the first positive potential contact part 5 to the bimetal springs 15 arranged in an electrically insulated manner in relation to the socket 2.

Figure 5:
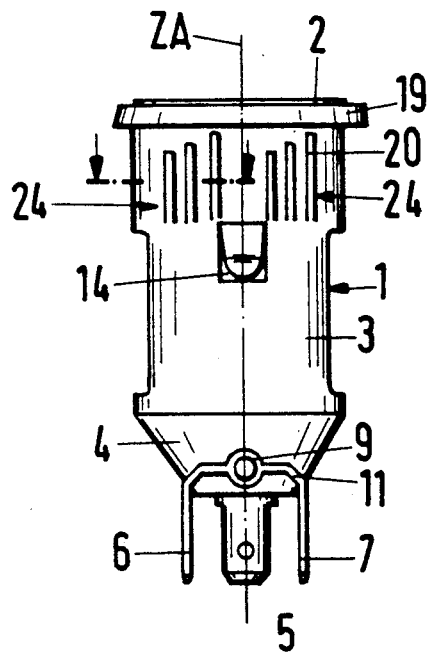
FIG. 5 shows a lateral view of the clamping sleeve wall having clamping ribs on the clamping sleeve according to the invention according to the first exemplary embodiment.

FIG. 5 shows the construction of the clamping ribs 20 located on the surface of the clamping sleeve wall 3. The clamping ribs 20 are arranged symmetrically radially in groups 24 of clamping ribs 20. Each group 24 has clamping ribs 20 of different lengths, with the distance from the end of a clamping rib 20 to an illumination ring 19 molded onto the beaker wall 3 corresponding to the wall thickness of a given instrument panel 18. The clamping ribs 20 can have a rectangular end or a sloped end, as shown in the detail views of FIGS. 1a and b. Instead of the clamping ribs 20, one or more steel springs 17 in beaker wall 3 can deflect out behind the instrument panel 18 to capture the clamping sleeve, as shown in particular in FIG. 2. Of course, any known fastening means (thread, adhesive, etc.) functioning in the same manner in respect of the secure capture of the clamping sleeve 1 can also be used.

Figure 6:
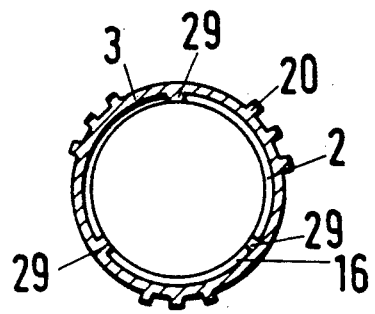
FIG. 6 shows a cross-section view through the clamping sleeve according to the sectional line VI—VI in FIG. 5.

FIG. 6 shows a cross-section through the clamping sleeve 1 taken along sectional line VI—VI of FIG. 5. Provided between the socket 2 and beaker wall 3 are spacer webs 29 and cavities 16 in order to allow a spring effect of the clamping ribs 20.

Figure 7:
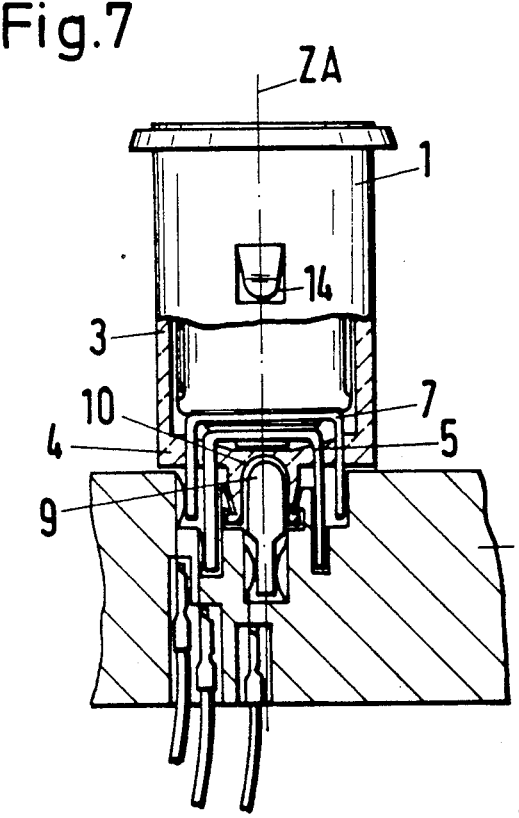
FIG. 7 shows a lateral partial view of the clamping sleeve of the invention according to a second exemplary embodiment, in which the contact parts contacting the connection plug are constructed as a coaxial connection.
Figure 10A:
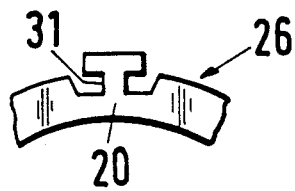
Figure 10B:
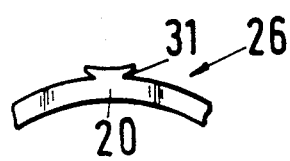
Figure 10C:
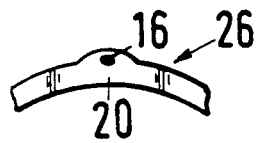
Figure 10D:
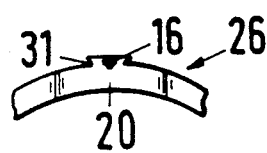
Figure 10E:
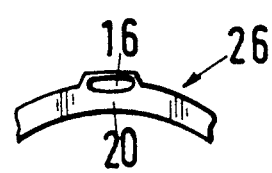
Figure 10F:
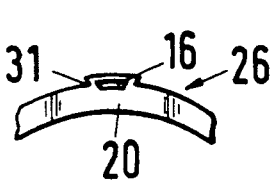

FIG. 7 shows the lateral sectional view of the clamping sleeve 1 of the invention according to a second exemplary embodiment, in which the contact parts 5, 7, shown contacting the connection plug 8, are constructed as a coaxial connection. If required, further contact parts can also be arranged coaxially. The lamp receptacle 10 for the lamp 9 is located axially centrally. In this case, the lamp 9 is installed in the connection plug 8 while the place of greatest light density lies at the center of the beaker bottom 4. For this purpose, a shoulder 30 is molded onto the beaker bottom 4, which shoulder forms a dovetail catch with the material of the connection plug 8. In order to enable the light to stream into the beaker wall 3, with this exemplary embodiment the contact parts 5, 7, which are constructed as hollow cylindrical annular contacts, must have strip-shaped light passage slots 23, as shown in FIG. 8.

Figure 8:
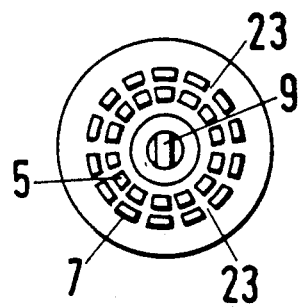
FIG. 8 shows a plan view of the arrangement of the contact parts according to the second exemplary embodiment of FIG. 7.

FIG. 8 shows a plan view of the coaxial arrangement of the contact parts 5, 7, provided with the light passage slots 23, according to the second exemplary embodiment of FIG. 7.

Figure 9:
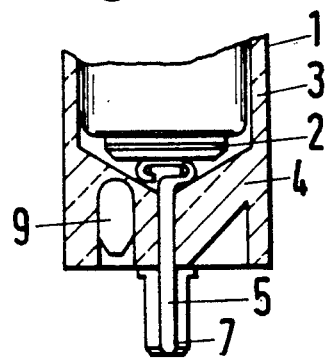
FIG. 9 shows a lateral partial view of the clamping sleeve of the invention of a third exemplary embodiment.

FIG. 9 shows a lateral partial view of the clamping sleeve 1 of the invention according to a third exemplary embodiment. In this case, the lamp 9 is arranged eccentrically axially in the beaker bottom 4.

FIGS. 10a-10f show various cross-sectional profiles 26 of clamping ribs 20 which deflect inwards when the clamping sleeve is pushed on the instrument panel 18, and which deflect outward to catch behind the completely pushed on instrument panel 18, for which purpose in some embodiments cavities 1 6 and/or cutouts 31 are provided.

We claim:

1. Illuminated electric cigarette lighter assembly for installation in and generally behind an instrument panel of a motor vehicle, comprising a clamping sleeve of beaker shape and having a front side, a bottom and a beaker wall, an illumination member located on the clamping sleeve front side, an electric lamp located proximate the clamping sleeve bottom, said clamping sleeve being of light-conducting material, cigarette lighter socket means for lighting cigarettes received in the clamping sleeve, with the clamping sleeve being between the socket means and the instrument panel, an imaginary surface defined by an extension of the beaker wall in the direction away from the illumination member, the outside diameter of the imaginary surface corresponding to the outside diameter of the clamping sleeve, and a plurality of contact part means, including at least one positive potential contact part and at least one negative potential contact part, for contacting a connection plug located behind the instrument panel, said contacting part means located on the connection plug side of the beaker bottom and located within a region which is bordered by the imaginary surface.

2. Assembly of claim 1, including lamps receptacle means located in the beaker bottom for receiving said lamps.

3. Assembly of claim 2, wherein the beaker wall is in the shape of a hollow cylinder, and the beaker bottom is in the shape of a solid cylinder.

4. Assembly of claim 3, wherein the beaker bottom is in the shape of a truncated cone.

5. Assembly of claim 2, wherein one of a positive contact part and a negative contact part penetrates the beaker bottom centrally and the other of a positive contact part and a negative contact part penetrates the beaker bottom eccentrically.

6. Assembly of claim 5, wherein the contact part means are contact surfaces, with a positive contact part and a negative contact part being positioned relative to each other so as to be in a T-shape.

7. Assembly of claim 2, wherein a second positive potential contact part penetrates the beaker bottom or is captured in the beaker bottom.

8. Assembly of claim 7, wherein the contact parts are positioned relative to each other so as to be in an I-shaped.

9. Assembly of claim 7, wherein lamp connection wires electrically connect the lamp to the negative potential contact part and to either the first positive potential contact part or the second positive potential contact part.

10. Assembly of claim 2, wherein the contact parts are arranged in the form of a coaxial connection.

11. Assembly of claim 10, wherein the contact parts are in the form of hollow cylindrical annular contacts having light passage slots therein.

12. Assembly of claim 2, wherein the lamp receptacle is located axially centrally in the beaker bottom, and is open on the connection plug side.

13. Assembly of claim 2, wherein the lamp receptacle is located eccentrically in the beaker bottom, and is open on the connection plug side.

14. Assembly of claim 2, wherein the lamp receptacle is aligned radically in the beaker bottom, and the first positive potential contact part is a contact surface which centrally penetrates the beaker bottom and defines a bore hole which generally corresponds to the diameter of the lamp.

15. Assembly of claim 2, including fastening means located on the outer surface of the beaker wall for fastening the clamping sleeve to the instrument panel.

16. Assembly of claim 15, wherein the fastening means are a plurality of clamping ribs.

17. Assembly of claim 16, wherein each said clamping rib has an insertion slope.

18. Assembly of claim 17, wherein each said clamping rib also has a removal slope.

19. Assembly of claim 17, wherein the clamping ribs are resilient clamping rib means corresponding to a respective thickness of the instrument panel for first deflecting inwards during pushing in a motion of the assembly in the instrument panel, and then deflecting outwards behind the instrument panel to capture the assembly therein.

20. Assembly of claim 19, including spacer web means and cavity means provided between the socket and the beaker wall for facilitating deflection of the clamping ribs.

21. Assembly of claim 17, wherein the clamping ribs are equidistantly aligned and are parallel to the axis of the clamping sleeve.

22. Assembly of claim 16, wherein the clamping ribs are arranged in a plurality of rotationally-symetric groups of clamping ribs, each rib in a group being of a different distance from the illumination member, with each distance of a rib from the illumination member corresponding to a given wall thickness of a given instrument panel.

23. Assembly of claim 11, wherein each group has a clamping rib which corresponds to a rib in each other group with respect to distance from the illumination member.

24. Assembly of claim 15, wherein the fastening means are at least one steel spring means for deflecting outwards behind the instrument panel to capture the assembly therein.

25. Assembly of claim 2, wherein the illumination member in an illumination ring.

26. In an electric cigarette lighter to be installed in an interior surface of a motor vehicle, comprising
a plurality of contact part means, including at least one positive potential contact part and at least one negative potential contact part, for electrically contacting a connection plug located behind the motor vehicle interior surface,
a socket,
a light-conducting clamping sleeve having an illumination ring on the front side and a bulb, and constructed to receive the socket and being located between the socket and the motor vehicle interior surface,
the improvement comprising
said clamping sleeve being of beaker shape and having a beaker wall and a beaker bottom
all of the contact parts being located on the connection plug side of the clamping sleeve and being inside a region bordered by an imaginary surface defined by an extension of the baker wall in the direction away from the illumination member, with the outside diameter of the imaginary surface corresponding to the outside diameter of the clamping sleeve, and
lamp receptacle means located in the beaker bottom for receiving the bulb.

27. Lighter of claim 26, wherein the clamping sleeve is in the shape of a hollow cylinder.

* * * * *